F., F. H. & W. A. ENGELHARD.
FLOAT.
APPLICATION FILED APR. 24, 1912.

1,046,162.

Patented Dec. 3, 1912.

WITNESSES:
A. C. Fairbanks.
G. A. Angier.

INVENTORS:
Frank Engelhard,
Frederick H. Engelhard,
BY William A. Engelhard,
Webster & Co.,
ATTORNEYS.

UNITED STATES PATENT OFFICE.

FRANK ENGELHARD, FREDERICK H. ENGELHARD, AND WILLIAM A. ENGELHARD, OF SPRINGFIELD, MASSACHUSETTS.

FLOAT.

1,046,162.  Specification of Letters Patent.  Patented Dec. 3, 1912.

Application filed April 24, 1912. Serial No. 692,833.

*To all whom it may concern:*

Be it known that we, FRANK ENGELHARD, FREDERICK H. ENGELHARD, and WILLIAM A. ENGELHARD, all citizens of the United States of America, and residents of Springfield, in the county of Hampden and State of Massachusetts, have invented a certain new and useful Float, of which the following is a specification.

Our invention relates to improvements in column-floats, float-balls, and the like, hereinafter generally termed simply "floats", for valves, in which sheet-metal sections are joined together to form the float in each case, and said invention resides essentially in the means employed to join together such sections, as will be more fully explained in the following description. Floats thus made in sections are very liable to break apart or rupture at the joints and to collapse at such points, and the primary object of our invention is to provide a float with a joint and a reinforcement at and adjacent to the junction of the sections comprising such float which are practically unbreakable and non-collapsible, whereby a float constructed with the aid of the new elements is prevented from collapsing, spreading or pulling apart at the place of union, and is actually stronger and more durable at and in the vicinity of the float-section juncture than in other portions.

In addition to affording adequate security and reinforcement at the place which naturally would otherwise be the weakest, our joint-forming and reinforcing means or device enhances the facility and convenience with which the float-sections can be united, and this is another object of our invention.

A further object is to produce a float which presents a smooth and symmetrical appearance on the outside and is in reality free from external unevenness or surface interruptions, which is done by locating the joining and bracing elements on the inside.

Other objects will appear in the course of the following description.

We attain these objects by the means illustrated in the accompanying drawings, in which—

Figure 1:
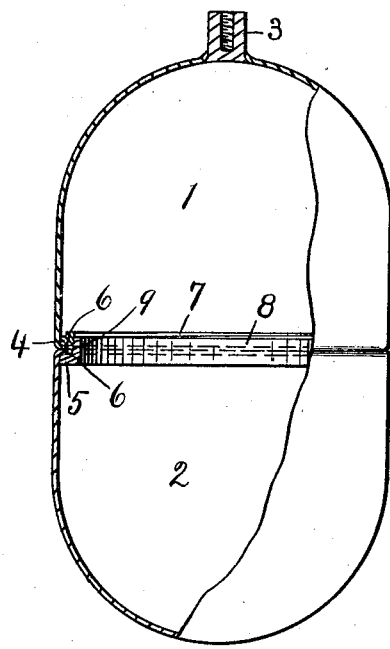
Figure 2:
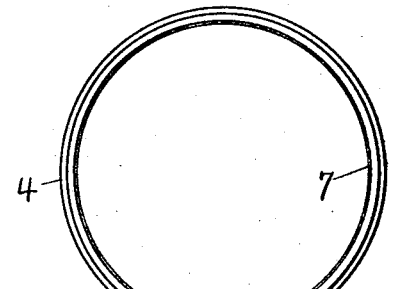
Figure 3:
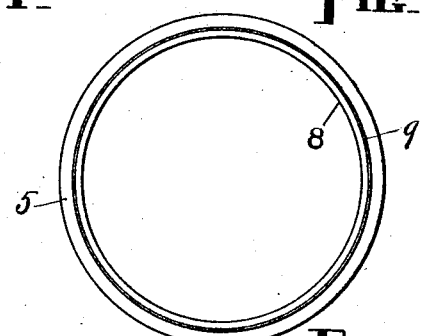
Figure 4:
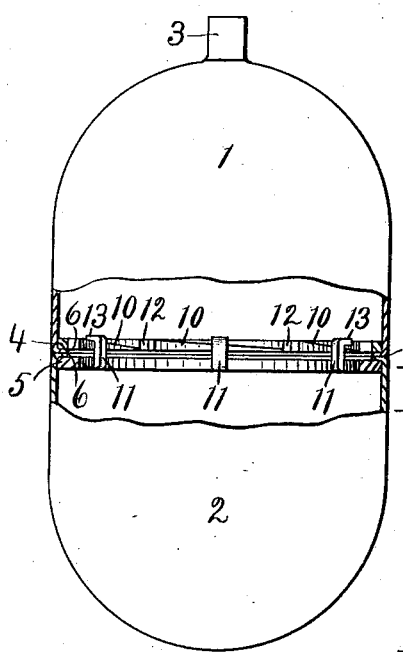
Figure 5:
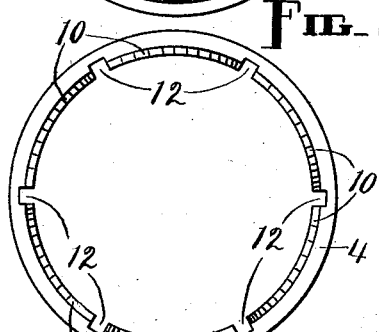
Figure 6:
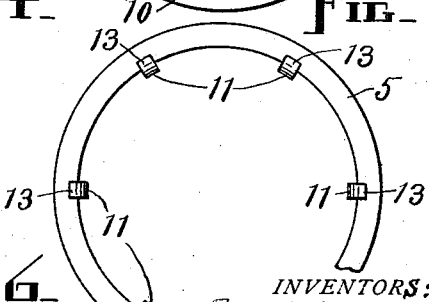

Figure 1 is a partial elevation and a partial section of a float which embodies a practical form of our invention; Fig. 2, a top plan of the upper ring employed in said float; Fig. 3, a top plan of the lower ring employed therein; Fig. 4, a partial elevation and partial section of a similar float to that shown in the first view except that a modified type of rings is employed; Fig. 5, a top plan of the upper of said last-mentioned rings, and, Fig. 6, a top plan of the lower of said last-mentioned rings.

Similar figures refer to similar parts throughout the several views.

Although we have used a column-float with which to illustrate the application of our invention, it is to be understood as already intimated that the invention is applicable to floats of other forms or shapes. It is to be understood further that, in addition to the changes in the kind of float itself as just noted, and in the construction of the joining and reinforcing members herein shown and described, other modifications and changes in some or all of the parts may be made without departing from the spirit of the invention or exceeding the scope of the appended claims.

In each of Figs. 1 and 4 a float comprising an upper section 1 and an under section 2 is represented, the upper section being provided at the top as is customary with an internally screw-threaded nipple 3. These sections in each case are united by means of two coupling or clamping rings 4 and 5, which are on the inside of the sections and serve as reinforcing agents for the sections and the float as a whole as well as locking members for said sections. The sections 1 and 2 respectively of each float have their rims spun onto the rings 4 and 5, in the present arrangement the rim or edge at the bottom of the section 1 being turned under the ring 4 which is inside of said section and secured thereto with solder, and the rim or edge at the top of the section 2 being turned over the ring 5 which is in said section 2. The ring 5 like the ring 4 is secured to its section 2 with solder. The inturned spun portions of the sections 1 and 2 appear at 6. The coupling or clamping rings are provided with means, presently to be described, whereby they can be advanced toward each other, upon turning the float sections to which they are attached in opposite directions, but each in the right direction, of course, to bring about the desired result, and so caused to close on the spun portions or flanges 6 and tightly grasp them and force them into contiguity. The rings 4 and 5 are substantial enough to both firmly and securely unite the flanges 6 and to resist any pressure that they would ordinarily be subjected to, and the joints formed by said flanges and rings are exceedingly strong and capable of withstanding a greater pressure from any direction than are the float sections at points remote from such joints.

As one means for attaching the rings 4 and 5 to each other we screw-thread the ring 4 on the inside, as shown at 7 in Figs. 1 and 2, and provide the ring 5 with an interior flange 8 and screw-thread that, as shown at 9 in Figs. 1 and 3, the threaded part 9 of said flange being of a diameter that corresponds with that of the threaded part 7. In this construction the float-section flanges 6 are received between the rings 4 and 5 in the space which surrounds the ring flange 8, and as said rings are screwed toward each other said flanges 6 are tightly clamped together and the rings are tightly clamped onto said last-mentioned flanges. It is clearly to be seen that the joint thus formed is quite as capable of resisting strain or pressure having a direction that is parallel with or oblique to the long axis of the float as it is of resisting strain or pressure applied laterally to the joint or the jointed portion of the float.

In lieu of the flange 8 and the screw-threaded parts for drawing the rings 4 and 5 toward each other and clamping them onto the flanges 6, coöperating inclines 10 and hooked fingers 11 may be employed, as shown in the last three views, such inclines being formed on one ring, as 4, and such fingers being provided for the other ring, as 5. In this case there are six each of the inclines 10 and fingers 11. The inclines 10 are formed on the upper surface of this ring 4 adjacent to the inner edge thereof, and they are arranged equi-distant apart with their lower ends alternating with their high ends, or, in other words, with the lower end of one incline next to the high end of the incline that is adjacent to said lower end. Between the inclines 10 the inner edge of the ring which is provided with said inclines is notched, as shown at 12, to admit of the passage of outwardly-extending lugs 13 which constitute the top portions of the fingers 11. The fingers 11 rise from the inside of their ring 5, being arranged at intervals to correspond with the notches 12, and turn outwardly to form the lugs 13. The space between the top of this ring 5 and the inside of any lug 13 is greater than the combined thickness of the flanges 6 and the depth of any incline 10 adjacent to its lower terminal portion, so that the lugs 13 can be brought into engagement with the inclines and actuated into wedging relationship therewith. In the first construction the sections 1 and 2 are locked together by simply screwing the threaded portions of the rings the one into the other and setting them up tight. In the Fig. 4 construction the sections 1 and 2 are locked together by bringing the fingers 11 into position to enable their lugs 13 to pass through the notches 12 and then thrusting said lugs through said notches and turning said sections in such a way as to cause said lugs to move up on the inclines 10. This action draws the rings toward each other and forces the flanges into close contact, thus securing them and the sections of which they form parts.

After the sections 1 and 2 are clamped together by either of the means and in the manner described above, the outside of the float thus made is coated or finished in any manner desired. A groove 14 is usually present around the outside of the float in the center, owing to the fact that the flanges 6 when spun onto the rings 4 and 5 do not make sharp corners in cross-section with the body portions of said sections, and such groove may be filled with solder so that the entire outer surface of the float will be smooth when finished—see Fig. 4. Although solder introduced into the groove 14 serves in a measure as a binding medium which would prevent the sections 1 and 2 from being or becoming loosened, as a matter of fact said sections are screwed or wedged together so tightly and securely that under no ordinary amount of usage will they ever become loose, hence the filling of said groove is of no importance so far as our invention is concerned.

What we claim as our invention, and desire to secure by Letters Patent, is—

1. As a new article of manufacture, a float comprising clamping rings, float sections spun onto the respective rings with the spun portions between them, and means to draw said rings toward each other and secure them one to the other.

2. As a new article of manufacture, a float comprising float sections provided with interior clamping rings and having inturned flanges between said rings, and means to draw said rings toward each other and secure them one to the other.

3. As a new article of manufacture, a float comprising float sections having inturned flanges, and coupling rings within the respective sections and flanges, such rings being provided with parts that are adapted to engage each other when said rings are rotated.

4. As a new article of manufacture, a float comprising float sections having inturned flanges, and clamping rings within the respective sections and flanges, such rings being provided with engaging drawing and securing means therefor.

5. As a new article of manufacture, a float comprising float sections having inturned flanges, and clamping rings within the respective sections and flanges, said rings being provided with engaging means adapted when said rings are rotated to cause them to approach each other and forcibly grasp said flanges and bind the same with said sections together.

FRANK ENGELHARD.
FREDERICK H. ENGELHARD.
WILLIAM A. ENGELHARD.

Witnesses:
A. C. FAIRBANKS,
J. C. DAHNER.

Copies of this patent may be obtained for five cents each, by addressing the "Commissioner of Patents, Washington, D. C."